(12) United States Patent
Pendzich (10) Patent No.: US 7,717,209 B2
(45) Date of Patent: *May 18, 2010

(54) VEHICLE WITH VERTICAL LIFT

(76) Inventor: Jerome S. Pendzich, 209 Reece Hill Rd., Hampton, TN (US) 37658-3615

( * ) Notice: Subject to any disclaimer, the term of this patent is extended or adjusted under 35 U.S.C. 154(b) by 0 days.

This patent is subject to a terminal disclaimer.

(21) Appl. No.: 12/359,776

(22) Filed: Jan. 26, 2009

(65) Prior Publication Data

US 2009/0140103 A1 Jun. 4, 2009

Related U.S. Application Data

(63) Continuation-in-part of application No. 11/615,664, filed on Dec. 22, 2006, now Pat. No. 7,481,290.

(51) Int. Cl.
*B60V 1/14* (2006.01)
*B64C 29/00* (2006.01)

(52) U.S. Cl. .................. 180/117; 180/118; 180/119; 244/23 D (58) Field of Classification Search ................ 180/117, 180/118, 119; 244/23 D
See application file for complete search history.

(56) References Cited

U.S. PATENT DOCUMENTS

| | | | |
|---|---|---|---|
| 3,608,662 A | 9/1971 | Ferguson |
| 3,799,446 A | 3/1974 | Rado |
| 4,071,207 A | 1/1978 | Piasecki et al. |
| 4,249,628 A | 2/1981 | Longley |
| 4,369,853 A | 1/1983 | Heijola et al. |
| 5,097,919 A | 3/1992 | Cox |
| 5,279,379 A | 1/1994 | Sixsmith |
| 5,370,197 A | 12/1994 | Goodwin et al. |
| 5,386,880 A | 2/1995 | Dubose |
| 5,520,260 A | 5/1996 | Stiegler et al. |
| 5,566,775 A | 10/1996 | Schoell |
| 6,591,928 B1 | 7/2003 | Blum |
| 6,883,748 B2 | 4/2005 | Yoeli |
| 2008/0149780 A1 | 6/2008 | Pendzich |

*Primary Examiner*—Tony H. Winner
(74) *Attorney, Agent, or Firm*—Knox Patents; Thomas A. Kulaga (57) ABSTRACT

An apparatus for producing vertical lift in a vehicle. In one embodiment, two sets of trans-flow fans discharge air through multi-directional vane assemblies that direct the discharged air outward and downward. Each one of the sets of fans is positioned on opposite sides of the vehicle. The multi-directional vane assemblies include vertical vanes that direct the discharged air fore and aft and horizontal vanes that direct the discharged air downward at various angles. In one embodiment, the vehicle includes a hovercraft skirt and a portion of the discharge air is directed into the skirt, causing the vehicle lift vertically on a cushion of air. In one such embodiment, a flow director controls the amount of discharged air flowing through the inlet to the volume defined by the skirt.

19 Claims, 5 Drawing Sheets

VEHICLE WITH VERTICAL LIFT

CROSS-REFERENCE TO RELATED APPLICATIONS

This application is a continuation-in-part of prior application Ser. No. 11/615,664, filed Dec. 22, 2006.

STATEMENT REGARDING FEDERALLY SPONSORED RESEARCH OR DEVELOPMENT

Not Applicable

BACKGROUND OF THE INVENTION

1. Field of Invention

This invention pertains to a vertical lift vehicle. More particularly, this invention pertains to a vehicle with trans-flow fans that provide directed thrust to lift and propel a vehicle.

2. Description of the Related Art

Vertical take-off and landing (VTOL) vehicles offer advantages of traditional aircraft and vehicles, which require long runways to develop the speed and lift required for flight. Traditional aircraft depend upon airfoils and forward speed in order to fly. The aircraft's forward speed causes airflow around the airfoils and that air flow provides the vertical lift that allows the vehicle to rise.

Various VTOL vehicles are known. Some such vehicles have propellers that move from a vertical orientation for take-off and landing to a horizontal orientation for forward travel. Another variation is a helicopter, which has a fixed vertical propeller. The propeller, or rotor, of a helicopter is oriented vertically and includes airfoil blades. As the rotor rotates, the blades experience vertical lift, which allows the helicopter to rise vertically.

Various types of vertical lift vehicles are known in the art, including the above-mentioned helicopter. One such vehicle is disclosed in U.S. Pat. No. 6,883,748, issued to Yoeli on Apr. 26, 2005, and titled "Vehicles particularly useful as VTOL vehicles." The Yoeli patent discloses a vehicle with at least a pair of vertically oriented propellers that provide vertical lift. The Yoeli vehicle has at least one propeller on each side of the vehicle's transverse axis.

It would be advantageous to provide a VTOL platform with no exposed rotor blades, to provide safe pilot ejection capabilities from a VTOL platform, to provide a faster land based capability from a VTOL platform, to provide a faster flight speed capability from a VTOL platform, to provide an easier to operate VTOL platform, and to provide emergency response for confined rescues. Further, it would be advantageous to provide a vehicle that produces less noise than conventional craft.

BRIEF SUMMARY OF THE INVENTION

According to one embodiment of the present invention, a vertical lift vehicle with a pair of trans-flow fans is provided. In one embodiment, the vehicle has a hovercraft skirt surrounding its lower surface. A pair of trans-flow fans are positioned along the sides of the vehicle with the axis of rotation of the fans parallel to the longitudinal axis of the vehicle. A multi-directional vane assembly is positioned adjacent the outlet of each trans-flow fan to direct the air from the outlet in various directions in order to propel the vehicle. In one embodiment, between the multi-directional vane assembly and the fan rotor is a skirt inlet that selectively allows a portion of the outlet air flow to be directed under the vehicle and contained by the hovercraft skirt. The portion of the outlet air flow directed under the vehicle is partially contained by the hovercraft skirt, with a portion of that air escaping from the bottom of the skirt, thereby causing the vehicle to lift vertically and ride upon a cushion of air. The portion of the outlet air not directed under the vehicle passes through the multi-directional vane assemblies for maneuvering and controlling the direction and speed of the vehicle.

In one embodiment, the multi-directional vane assembly includes horizontal vanes and vertical vanes. The horizontal vanes run the length of each trans-flow fan rotor. The horizontal vanes direct the outlet air from the fans to have a specified vertical direction. With the horizontal vanes directing the outlet air downward, the fans develop thrust that tends to lift the vehicle vertically. Adjusting the horizontal vanes to direct the outlet air in a more horizontal direction reduces the downward thrust and directs that thrust to the side of the vehicle.

A set of vertical vanes are positioned at the forward end of the trans-flow fan rotors on each side of the vehicle, and a second set of vertical vanes are positioned at the aft end of the rotors on each side of the vehicle. The vertical vanes direct the outlet air from the fans to have a specified horizontal direction. For example, when the vertical vanes direct the outlet air in a rearward or aft direction, the vehicle is propelled forward. Alternatively, when the vertical vanes direct the outlet air in a forward direction, the vehicle is propelled rearward or the vehicle's forward motion is counteracted. By selectively controlling the vertical vanes located at each corner of the vehicle, the vehicle can be maneuvered in various manners, such as linearly in the forward and reverse directions, or rotationally, left or right, such as when making a turn.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for a vertical lift vehicle 100 is disclosed. In one embodiment, the vertical lift vehicle 100 is a hovercraft that relies upon ground effects to lift the vehicle 100 vertically. After the vehicle 100 is lifted vertically, the vehicle 100 moves along the surface by the force of air discharged from the vehicle 100.

Figure 1:
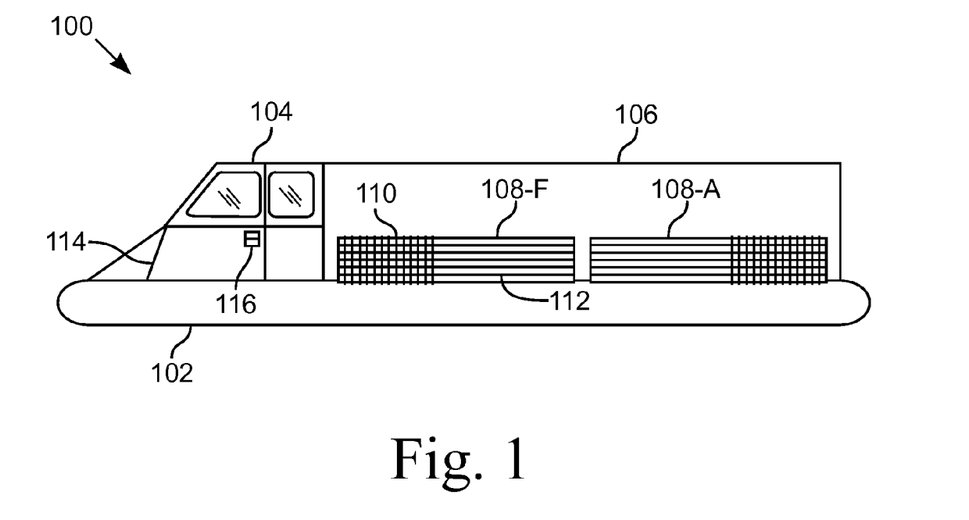
FIG. 1 is a side view of one embodiment of a vertical lift vehicle.

FIG. 1 illustrates a side view of one embodiment of a vertical lift vehicle 100. The vehicle 100 includes an elongated fuselage, or frame, 106 with a cockpit 104 at the forward end. The cockpit 104 is accessed from the outside through a door 114 that is opened with a latch 116. The lower portion of the fuselage 106 is surrounded with a skirt 102. The forward multi-directional vane assembly 108-F includes a plurality of horizontally oriented vanes 112 and a plurality of vertically oriented vanes 100 at the forward end of the vane assembly 108-F. The aft multi-directional vane assembly 108-A includes a plurality of horizontally oriented vanes 112 and a plurality of vertically oriented vanes 100 at the aft end of the vane assembly 108-A.

Figure 2:
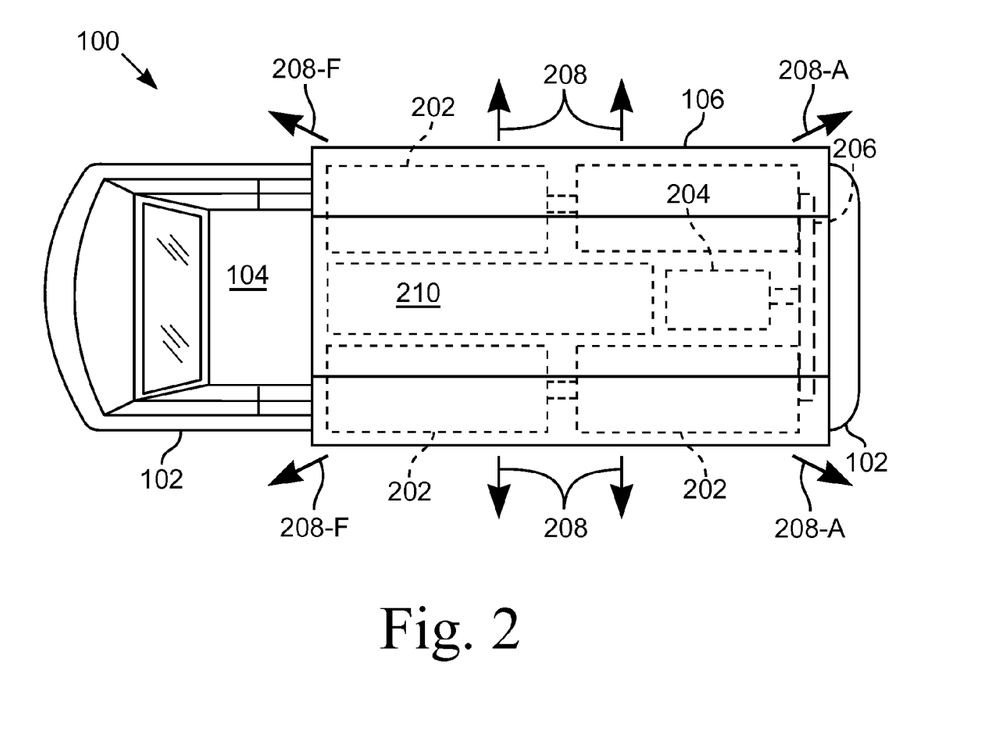
FIG. 2 is a top view of the vertical lift vehicle shown in FIG. 1.

FIG. 2 illustrates a top view of the vertical lift vehicle 100 shown in FIG. 1. The fuselage 106 contains two sets of trans-flow fans 202, illustrated with dashed lines. Each set of fans 202 includes two in-line fans 202 that are coupled to rotate together. Between the sets of fans 202 amidships is a storage, or cargo, area 210. The cargo area 210 allows for the storage and transport of cargo by the vehicle 100. Between the sets of fans 202 is a drive unit 204 attached to a drive coupling 206 that is operatively connected to each set of fans 202. The drive unit 204 is a device, such as an engine or turbine, that provides rotary power that causes the rotors of the fans 202 to rotate. The drive coupling 206 is a transmission or other mechanical power transfer mechanism, for example, a belt drive system, that transfers the rotary motion of the drive unit 204 to each of the fans 202. In one embodiment, each set of trans-flow fans 202 rotates in an opposite direction. That is, the starboard side pair of fans 202 rotates clockwise and the port side pair of fans 202 rotates counterclockwise as seen from the front of the vehicle 100. The counter-rotating fans 202 add stability to the vehicle 100 through the gyroscopic effect of the rotating fan rotors 416. In another embodiment, a pair of drive units 204 each drive a pair of trans-flow fans 202.

The fuselage 106 includes structural members that support the trans-flow fans 202, along with the cockpit 104 and any cargo in the cargo bay 210. In various embodiments, the drive unit 204 and the cargo bay 210 are configured to balance the effects of the thrust provided by the trans-flow fans 202 and to maintain the vessel 100 on an even keel and in a balanced configuration.

FIG. 2 also illustrates the air flow 208 from the sets of trans-flow fans 202. Multi-directional vane assemblies 108 are positioned on opposite sides of the fuselage 106. The multi-directional vane assemblies 108 include vanes 110, 112 that allow the air flow 208 to be directed in a selected direction. The vertical vanes 110 are adjustable and allow for the selection of the direction of air flow between a forward direction 208-F and a aftward direction 208-A. The forward vertical vanes 110 permit the air flow 208-F from the trans-flow fans 202 to be directed forward. The aft vertical vanes 110 permit the air flow 208-A from the trans-flow fans 202 to be directed to the rear or aft of the vehicle 100. Accordingly, the vertical vanes 110 direct the air flow 208 between a forward direction 208-F and an aftward direction 208-A. The horizontal vanes 112 are also adjustable and allow for the selection of the direction of air flow in a generally downward direction at the sides of the vehicle 100.

Figure 3:
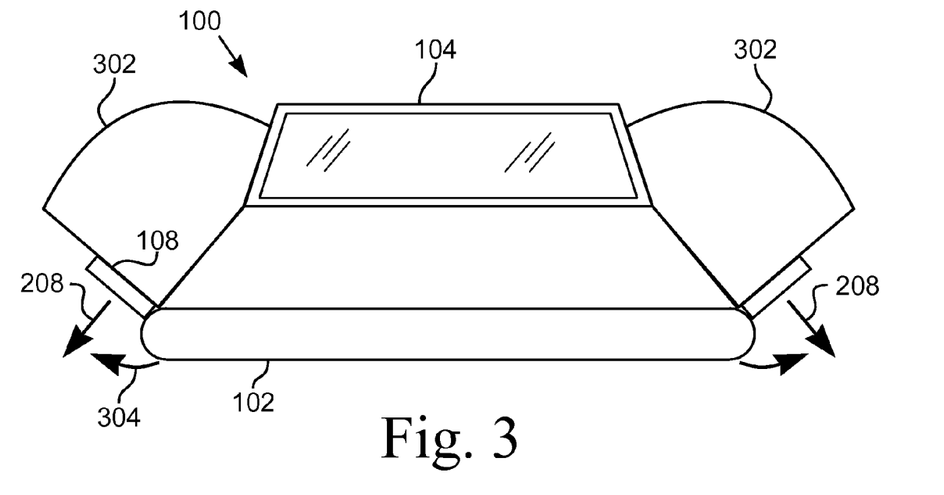
FIG. 3 is a front view of the vertical lift vehicle shown in FIG. 1.

FIG. 3 illustrates a front view of the vertical lift vehicle 100 shown in FIG. 1. The cockpit 104 is sandwiched between two nacelles 302 that contain the trans-flow fans 202. Positioned near the lower end of the nacelles 302 and adjacent the hovercraft skirt 102 are the multi-directional vane assemblies 108. Air flow 208 from the fans 202 in the nacelles 302 is directed at approximately a 45 degree angle from vertical.

The hovercraft skirt 102 surrounds the lower portion of the vehicle 100. An air flow 304 emanates from the bottom edge of the skirt 102. The fans 202 direct air into the volume defined by the skirt 102 and the air 304 escapes from that volume at the bottom edge of the skirt 102 adjacent to the ground or surface below the vehicle 100.

Figure 4:
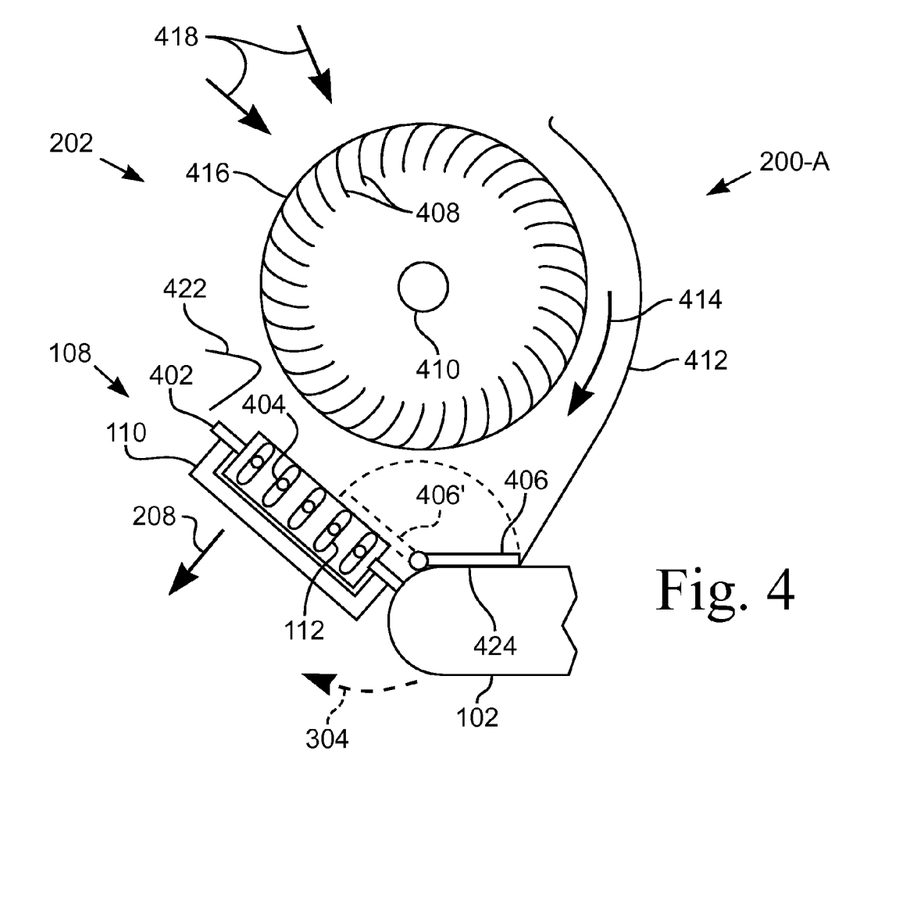
FIG. 4 is a symbolic drawing of an axial view of one embodiment of a trans-flow fan assembly.

FIG. 4 illustrates a symbolic drawing of an axial view of one embodiment of a trans-flow fan assembly 200-A. Trans-flow fans 202 are also known as cross-flow fans and/or tangential blowers. Trans-flow fans 202 have a squirrel cage rotor 416 that rotates about an axis 410. The length of the rotor 416 is typically longer than the diameter of the rotor 416. The squirrel cage of the rotor 416 has a hollow center with axial fan blades 408 along the periphery. Air intake 418 is along the periphery of the rotor 416. As the rotor 416 rotates, the rotor 416 forces an air flow 414 between the rotor 416 and the baffle 412. The baffle, or shroud, 412 constrains and directs the air flow 414 towards the outlet, which is defined as the space between the downstream side of the baffle 412 and the separator 422. The intake and outlet occur along the full length of the rotor 416.

The outlet of the fan 202 is in communication with the multi-directional vane assembly 108 and the inlet 424 to the skirt 102. In the illustrated embodiment, a flow director 406 is shown blocking the air flow 414 from entering the inlet 424 to the skirt 102. In the illustrated position of the flow director 406, all the air flow 414 from the fan 202 is directed through the multi-directional vane assembly 108 as air flow 208 that is directed substantially out and downward, providing lift to the vehicle 100. The illustrated embodiment of the flow director 406 pivots into a second position 406' that covers a portion of the flow path through the multi-directional vane assembly 108 and opens the inlet 424 to the skirt 102. The volume defined by the skirt 102 receives a portion of the air flow 414, which inflates the skirt 102, provides lift to the vehicle 100, and escapes as an air flow 304 from the bottom edge of the skirt 102. In one embodiment, the flow director 406 is adjustable between the two extreme positions 406, 406' such that the amount of the air flow 414 diverted to the skirt 102 is selectable. In other embodiments, the flow director 406 is a device that selectively blocks the inlet 424, for example, with a sliding member.

Figure 5:
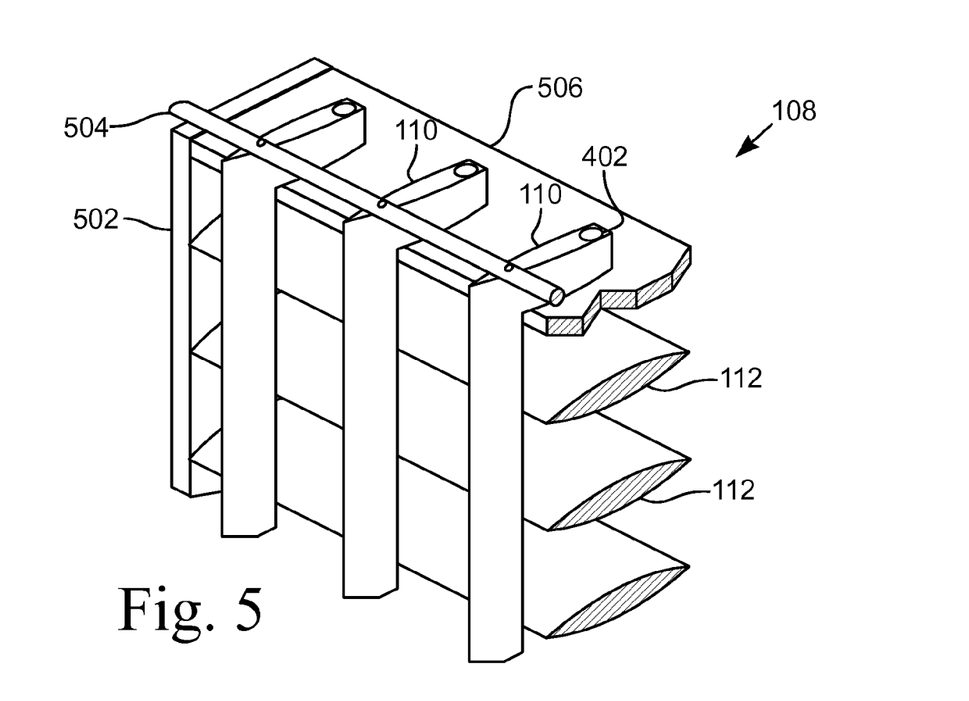
FIG. 5 is a partial perspective view of one embodiment of a multi-directional vane assembly.
Figure 6:
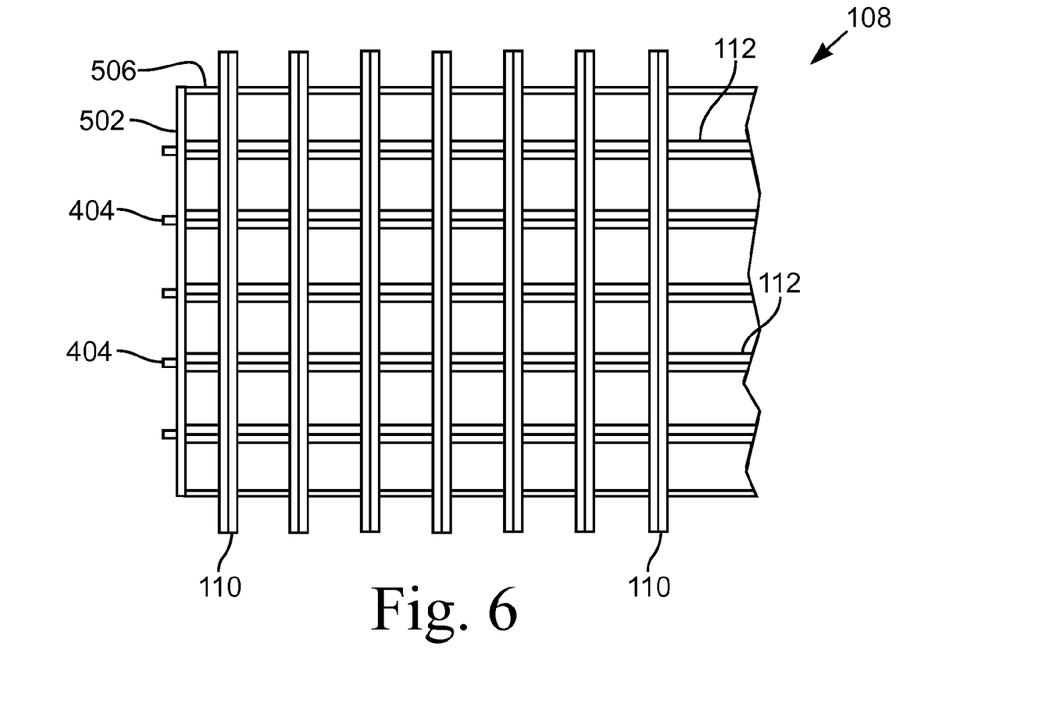
FIG. 6 is a front view of the multi-directional vane assembly shown in FIG. 5.

FIG. 5 illustrates a partial perspective view of one embodiment of a multi-directional vane assembly 108. FIG. 6 illustrates a front view of the multi-directional vane assembly 108 shown in FIG. 5. The multi-directional vane assembly 108 includes a pair of sidewalls 502 and top and bottom walls 506.

The vertical vanes 110 are attached to the top and bottom walls 506 by a pivot axis 402. The vertical vanes 110 pivot about the axis 402 to direct the air flow 208 forward or aftward. The vertical vanes 110 are connected together with an actuator arm 504. The actuator arm 504 moves linearly and causes the vertical vanes 110 to pivot about their axes 402. The actuator arm 504 is caused to be moved linearly by a control system under the control of an operator of the vehicle 100.

The horizontal vanes 112 are attached to the sidewalls with a pivoting connection. In a similar manner as the vertical vanes 110, the horizontal vanes 112 are connected to an actuator that controls the position of the horizontal vanes 112 and correspondingly directs the air flow 208 at a selected angle relative to the vehicle 100.

Figure 7:
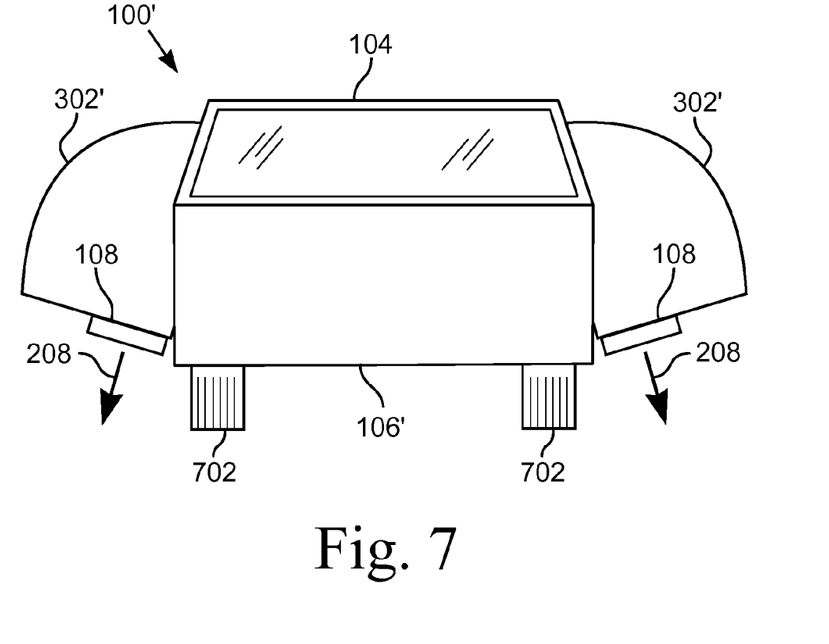
FIG. 7 is a front view of another embodiment of a vertical lift vehicle.
Figure 8:
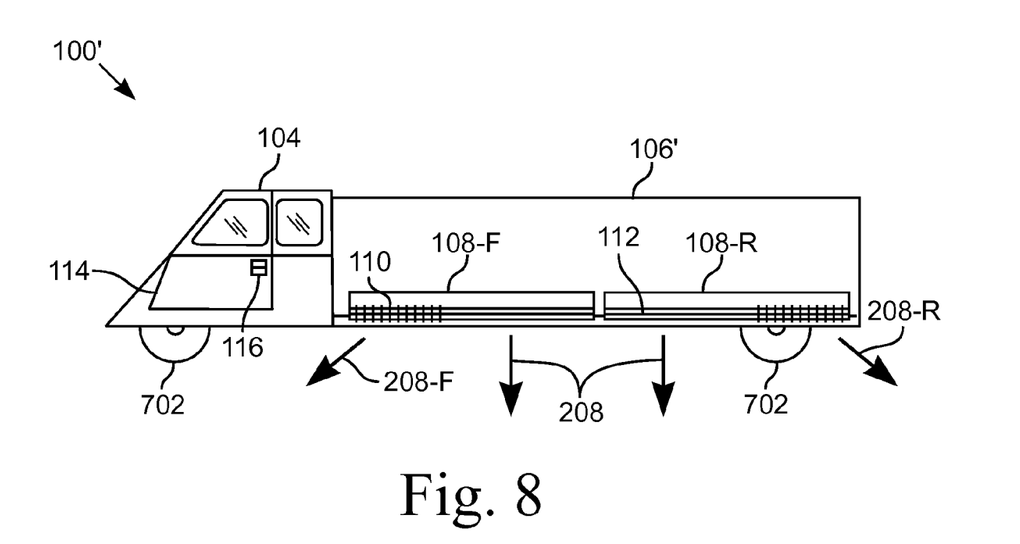
FIG. 8 is a side view of the embodiment of a vertical lift vehicle shown in FIG. 7.

FIG. 7 illustrates a front view of another embodiment of a vertical lift vehicle 100'. FIG. 8 illustrates a side view of the embodiment of a vertical lift vehicle 100' shown in FIG. 7. A set of tires, or wheels, 702 extend from the underside of the fuselage 106' of vehicle 100'. In various embodiments, one or more of the tires 702 are driven by the drive unit 204 that also powers the trans-flow fans 202. In such embodiments, the tires 702 provide support for the fuselage 106' and ground mobility.

The nacelles 302' enclosing the trans-flow fans 202 are oriented such that the multi-directional vane assemblies 108, which are adjacent the outlet of the fans 202, are directed substantially downward. The drive unit 204 and cargo bay 210 are situated between the fans 202 in the fuselage 106'.

The multi-directional vane assemblies 108 include a forward assembly 108-F and a aft assembly 108-A. Each assembly 108 includes vertical vanes 110 and horizontal vanes 112. The vertical vanes 110 direct the air flow 208-F, 208-A between selected forward and aft directions. The horizontal vanes 112 direct the air flow 208 between various angles from vertical and provides vertical thrust to lift the vehicle 100'.

Figure 9:
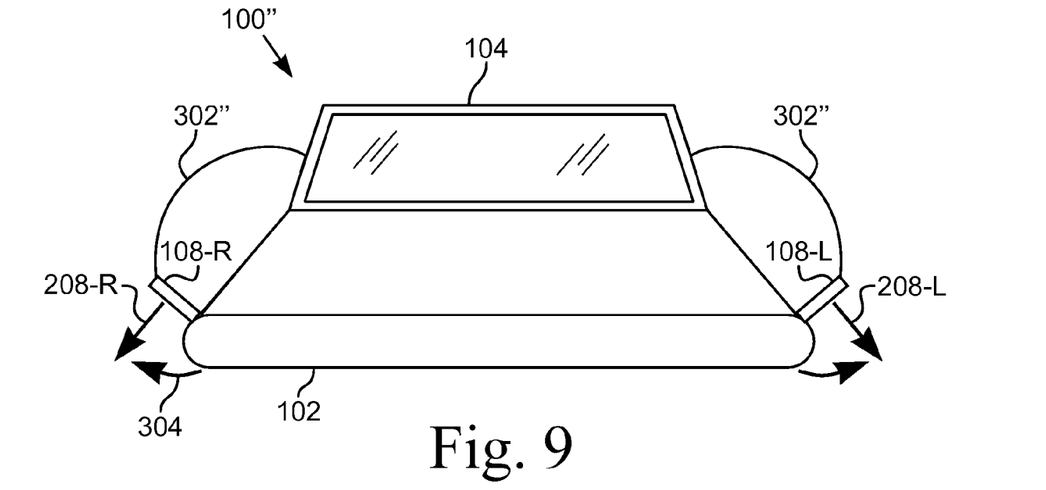
FIG. 9 is a front view of another embodiment of a vertical lift vehicle.

FIG. 9 illustrates a front view of another embodiment of the vertical lift vehicle 100". The cockpit 104 is sandwiched between two nacelles 302" that contain the trans-flow fans 202. The nacelles 302" are positioned on a frame of the vehicle 100" with the axis of rotation of the fans 202 parallel with each other and with an axis of the vehicle 100". Positioned near the lower end of the nacelles 302 and adjacent the hovercraft skirt 102 are the multi-directional vane assemblies 108-R, 108-L that provide steering control of the vehicle 100". The air flow 208-R, 208-L from the vane assemblies 108-R, 108-L in the nacelles 302" is selectively directed in a variety of directions, allowing the vehicle 100" to be driven forward, in reverse, sideways, and turned left or right.

The hovercraft skirt 102 surrounds the lower portion of the vehicle 100". An air flow 304 emanates from the bottom edge of the skirt 102. The fans 202 direct air into the volume defined by the skirt 102 and the air 304 escapes from that volume at the bottom edge of the skirt 102 adjacent to the ground or surface below the vehicle 100".

Figure 10:
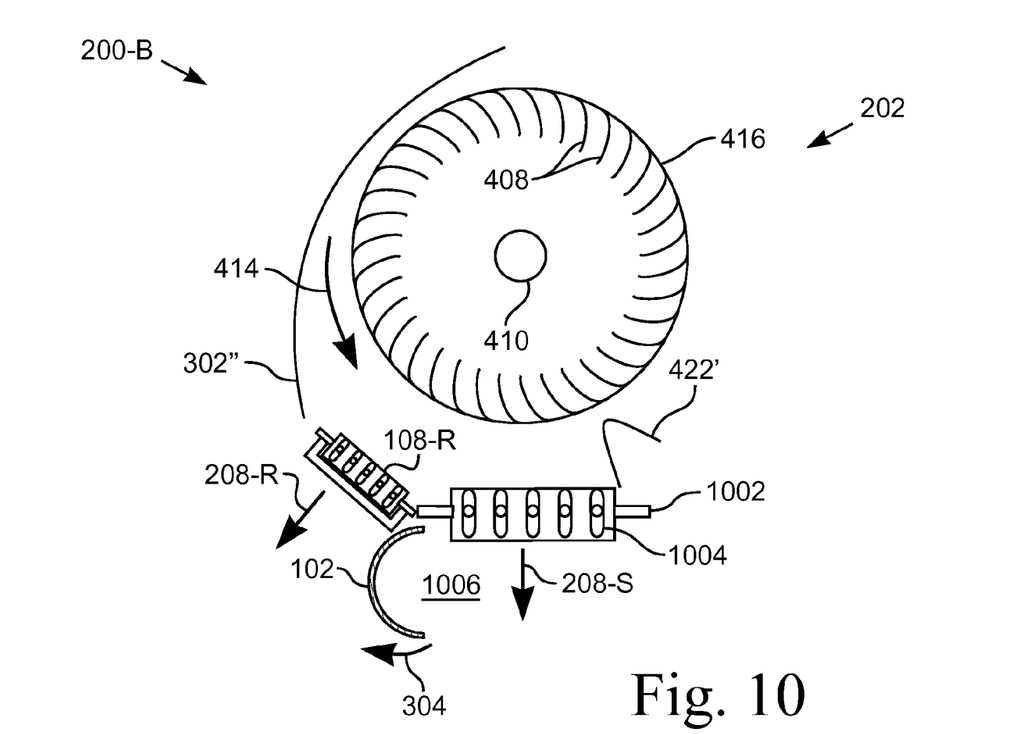
FIG. 10 is symbolic drawing of an axial view of another embodiment of a trans-flow fan assembly for the vehicle illustrated in FIG. 9.

FIG. 10 illustrates a symbolic drawing of an axial view of another embodiment of a trans-flow fan assembly 200-B for the vehicle 100" illustrated in FIG. 9. In the illustrated embodiment, the majority of the fan air flow 414 is directed to the skirt volume 1006, with a lesser portion of the fan air flow 414 directed to the air flow 208-R that provides lateral control of the vehicle 100". The illustrated fan assembly 200-B is for the fan 202 on the right side of the vehicle 100" and includes a trans-flow fan 202, the nacelle 302", a separator 422', a multi-directional vane assembly 108-R, and a skirt vane assembly 1002. In one embodiment, the left side fan assembly 200-B has a rotor 416 that rotates in the opposite direction than the illustrated rotor 416. The outboard portion of the nacelle 302" functions as a shroud that contains and directs the air from the fan 202 to the multi-directional vane assembly 108-R, and a skirt vane assembly 1002. In one embodiment, a separate baffle or shroud that is independent of the nacelle 302" contains and directs the air flow 414.

The fan assembly 200-B has an outlet port that is defined by the bottom of the nacelle 302" or baffle and the separator 422'. The outlet port has a portion that communicates with the skirt vane assembly 1002 and a portion that communicates with the multi-directional vane assembly 108-R. The portion that communicates with the skirt vane assembly 1002 is directed substantially downward. The portion that communicates with the multi-directional vane assembly 108-R is directed at an angle toward the outside of the vehicle 100".

As the fan rotor 416 rotates, the air flow 414 is directed toward the multi-directional vane assembly 108-R, which provides steering and lateral stability for the vehicle 100". In the illustrated embodiment, the vane assembly 108-R is shown at about 45 degrees. In other embodiments, the vane assembly 108 is positioned more vertically to direct more force laterally. The illustrated vane assembly 108 includes both vertical and horizontal vanes, which allow the air flow 208-L from the vane assembly 108-R to be directed either forward or aft 208-F, 208-A or upward or downward. In another embodiment, the vane assembly 108-R includes only vertical vanes 110 to maximize the air flow 208-R available to control the vehicle 100" laterally.

The air flow 414 from the rotating fan 202 is also directed through the skirt vane assembly 1002 and into the volume 1006 contained by the skirt 102. The air flow 208-S into the skirt volume 1006 increases the air pressure and inflates the skirt 102, thereby lifting and supporting the vehicle 100". The constant air flow 208-S also creates an air flow 304 between the skirt 102 and the ground, thereby allowing the vehicle 100" to float on a cushion of air. In various embodiments, the skirt vane assembly 1002 has vanes 1004 oriented parallel to the axis of rotation of the fan 202, as illustrated, or perpendicular to the axis of rotation. In still another embodiment, the fan assembly 200-B includes, instead of the skirt vane assembly 1002, a flow director 206 as illustrated in FIG. 4. The function of controlling the air flow 208-S into the skirt volume 1006 is implemented, in various embodiments, by skirt vane assembly 1002, the flow director 206, or the size of the inlet 424 into the skirt volume 1006.

The vertical lift vehicle 100 includes various functions. The function of providing a source of pressurized air is implemented, in one embodiment, by the trans-flow fans 202 positioned on opposite sides of the fuselage 106 of the vehicle 100.

The function of vertically lifting the vehicle 100 is implemented, in one embodiment, by the trans-flow fans 202 directing air flow 414 into the volume defined by the skirt 102, the underside of the fuselage 106, and the ground surface below the vehicle 100. In another embodiment of the vehicle 100', the function of vertically lifting is implemented by the fans 202 directing air flow 208 substantially downward.

The function of controlling the amount of air flow 414 into the volume defined by the skirt 102 is implemented, in one embodiment, by the flap, or flow director, 406 positioned adjacent the inlet 424 to the skirt volume. The position of the flow diverter 406 determines how much of the air flow 414 is directed to the skirt 102 and to the multi-directional vane assembly 108.

The function of propelling the vehicle 100 is implemented, in one embodiment, by the multi-directional vane assemblies 108 positioned adjacent the trans-flow fans 202. In another embodiment of the vehicle 100', the function of propelling includes a set of wheels 702 positioned under the fuselage 106'.

The function of propelling the vehicle 100 in the forward direction is implemented, in one embodiment, by the vertical vanes 110 in the multi-directional vane assemblies 108. The vertical vanes 110 are positioned to direct the air flow rearward 208-A, which propels the vehicle 100 forward.

The function of turning the vehicle 100 is implemented, in one embodiment, by the vertical vanes 110 in the multi-directional vane assemblies 108 directing air from the fans 108 in opposite directions on opposing sides of the fuselage 106. For example, the vehicle 100 turns left when the vertical vanes 110 on the left side of the fuselage 106 are positioned to direct air flow forward 208-F and the vertical vanes 110 on the right side of the fuselage 106 are positioned to direct air flow rearward 208-A. Such a configuration of the vertical vanes 110 applies a twisting force to the vehicle 100, thereby causing the vehicle 100 to spin to the left.

The function of propelling the vehicle 100 in the reverse direction is implemented, in one embodiment, by the vertical vanes 110 in the multi-directional vane assemblies 108. The vertical vanes 110 are positioned to direct the air flow forward 208-F, which propels the vehicle 100 in reverse.

From the foregoing description, it will be recognized by those skilled in the art that a vertical lift vehicle 100 has been provided. The vertical lift vehicle 100 has a fuselage 106 with at least one trans-flow fan 202 positioned on opposite sides of the fuselage 106. The trans-flow fans 202 rotate in opposite directions relative to each other. The trans-flow fans 202 have a quieter operating mode than conventional propellers, which results in a quieter operating vehicle 100.

Multi-directional vane assemblies 108 are positioned adjacent each outlet of the trans-flow fans 202. The multi-directional vane assemblies 108 include vertical vanes 110 and horizontal vanes 112. Both sets of vanes 110, 112 are adjustable to direct the air flow 208 from the fans 202 in a selected direction, such as forward 208-F, aftward 208-A, or to the side and downward. In one embodiment, the vehicle 100 includes a flap, or flow director, 406 that selectively allows air 414 to flow into a volume defined by the skirt 102, the underside of the fuselage 106, and the ground surface. The air flowing into the skirt 102 escapes from the skirt 102 as air flowing 304 from the bottom edge of the skirt 102 adjacent the ground surface. The air pressure in the skirt 102 creates a cushion of air that lifts the vehicle 100 vertically.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for producing vertical lift in a vehicle, said apparatus comprising:
    a first fan positioned on a first side of the vehicle, said first fan being a trans-flow fan, said first fan having an axis of rotation substantially parallel to a longitudinal axis of said vehicle;
    a second fan positioned on a second side of the vehicle, said second fan being a trans-flow fan, said second side opposite said first side, said second fan having a direction of rotation opposite that of said first fan, said second fan having an axis of rotation substantially parallel to said longitudinal axis of said vehicle;
    a first vane assembly positioned adjacent a discharge outlet of said first fan, said first vane assembly having a first discharge position configured to direct air from said first fan in a forward direction, said first vane assembly having a second discharge position configured to direct air from said first fan in a rearward direction;
    a second vane assembly positioned adjacent a discharge outlet of said second fan, said second vane assembly having a first discharge position configured to direct air from said second fan in a forward direction, said second vane assembly having a second discharge position configured to direct air from said second fan in a rearward direction; and
    a skirt defining a volume, said skirt configured to be in communication with said discharge outlet of at least one of said first fan or said second fan, said skirt configured to create a cushion of air that supports said frame.

2. The apparatus of claim 1 further including a cargo bay positioned between said first fan and said second fan.

3. The apparatus of claim 1 further including a drive unit operatively connected to both said first fan and said second fan, said drive unit configured to rotate said first fan and said second fan at a selected speed.

4. The apparatus of claim 1 further including at least one skirt inlet configured to control an air flow into said volume defined by said skirt.

5. The apparatus of claim 1 wherein said discharge outlet of each of said first and second fans has a portion that is directed substantially downward.

6. An apparatus for producing vertical lift in a vehicle, said apparatus comprising:
    a first fan positioned on a first side of a frame of the vehicle, said first fan being a trans-flow fan, said first fan having an axis of rotation substantially parallel to a first axis of said fuselage, said first trans-flow fan having a first fan exhaust outlet configured to exhaust a flow of air from said first fan;
    a second fan positioned on a second side of said frame, said second fan being a trans-flow fan, said second side opposite said first side, said second fan having a direction of rotation opposite that of said first fan, said second fan having an axis of rotation substantially parallel to said first axis of said frame;
    a first vane assembly including a plurality of vanes, said first vane assembly adjacent said first fan exhaust outlet, said plurality of vanes selectively directing a portion of a flow of exhaust air from said first fan exhaust outlet;
    a second vane assembly including a plurality of vanes, said second vane assembly adjacent said second fan exhaust outlet, said plurality of vanes selectively directing a portion of a flow of exhaust air from said second fan exhaust outlet; and
    a skirt enclosing a volume, said skirt configured to be in communication with at least one of said first fan exhaust outlet and said second fan exhaust outlet, and said skirt configured to create a cushion of air that supports said frame when said volume receives a flow of air from said at least one of said first fan exhaust outlet and said second fan exhaust outlet.

7. The apparatus of claim 6 further including at least one inlet configured to control an air flow into said volume defined by said skirt.

8. The apparatus of claim 6 wherein said first and second vane assemblies selectively propel the vehicle in a forward direction.

9. The apparatus of claim 6 wherein said first and second vane assemblies operate to turn the vehicle by a force of exhausted air.

10. The apparatus of claim 6 further including a cargo bay positioned between said first fan and said second fan.

11. The apparatus of claim 6 further including a drive unit operatively connected to both said first fan and said second fan, said drive unit configured to rotate said first fan and said second fan at a selected speed.

12. An apparatus for producing vertical lift in a vehicle, said apparatus comprising:
    a frame having a first axis; and
    a pair of fans attached to said frame, said pair of fans each having an axis of rotation substantially parallel to said first axis of said frame, said axis of rotation of a first one of said pair of fans being opposite said axis of rotation of a second one of said pair of fans, each one of said pair of fans having a squirrel cage rotor and an outlet, a first one of said outlets positioned to discharge on one side of said first axis of said frame and a second one of said outlets positioned to discharge on an other side of said first axis, said outlets configured to direct air from said pair of fans to provide lift to said frame, said outlets configured to direct air laterally to provide lateral motive force to said frame.

13. The apparatus of claim 12 further including a pair of vane assemblies each positioned adjacent said outlet, each of said vane assemblies configured to direct an air flow from said outlet in a selected direction.

14. The apparatus of claim 12 further including a pair of vane assemblies each positioned adjacent said outlet, said pair of vane assemblies each include a plurality of vertical vanes configured to selectively direct air from said outlet between a forward direction and a rearward direction.

15. The apparatus of claim 12 further including a skirt configured to receive a portion of an air flow from at least one of said pair of fans, said skirt configured to form a cushion of air to support said frame when said skirt receives said air flow.

16. The apparatus of claim 15 further including a pair of vane assemblies each positioned adjacent said outlet, each of said vane assemblies configured to direct an air flow from said outlet in a selected direction.

17. The apparatus of claim 15 further including a pair of vane assemblies each positioned adjacent said outlet, said pair of vane assemblies each include a plurality of vertical vanes configured to selectively direct air from said outlet between a forward direction and a rearward direction.

18. The apparatus of claim 15 further including at least one skirt inlet configured to control said air flow into a volume defined by said skirt.

19. The apparatus of claim 12 further including a set of wheels extending downward from said frame, said wheels operatively connected to a drive unit and configured to provide motive power to said frame when the vehicle is on a surface.

* * * * *